Oct. 10, 1939.   J. M. SIMPSON   2,175,857
TRANSMISSION SYNCHRONIZER
Filed Feb. 20, 1937
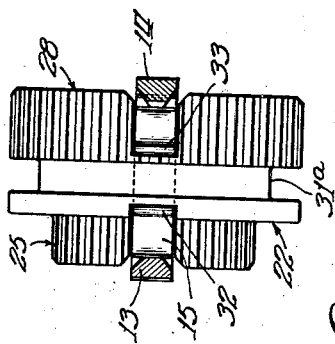
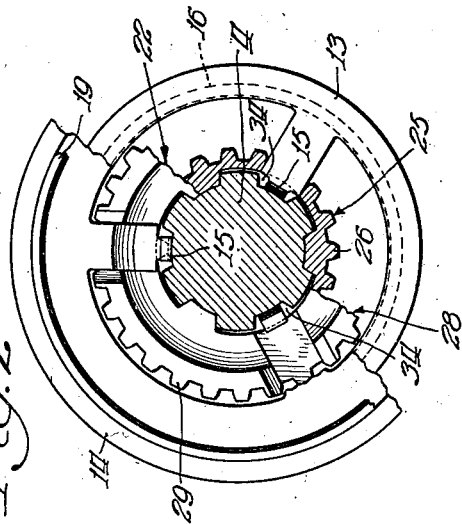
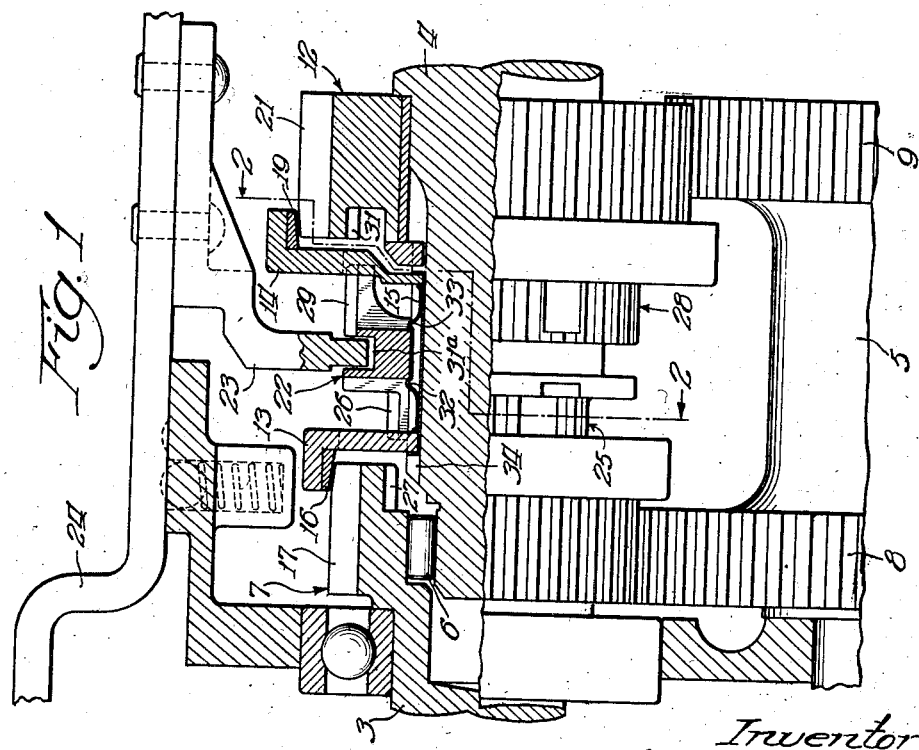
Inventor:
John M. Simpson
By: Edward C. Gritzbaugh
Atty.

Patented Oct. 10, 1939

2,175,857

UNITED STATES PATENT OFFICE 2,175,857

TRANSMISSION SYNCHRONIZER

John M. Simpson, Muncie, Ind., assignor to Borg-Warner Corporation, Chicago, Ill., a corporation of Illinois Application February 20, 1937, Serial No. 126,764

2 Claims. (Cl. 192—53)

This invention relates to improvements in transmission synchronizers of the type which may be used to synchronize the speed-changing gear mechanism of a motor vehicle transmission.

An object of this invention is to provide an improved transmission synchronizer.

Another object is to provide a transmission synchronizer which occupies relatively small space along its longitudinal axis.

Other objects and advantages will become apparent after reading the following description and claims.

An embodiment of the invention is illustrated in the accompanying drawing, in which:

Fig. 1 is a side elevation of a change speed unit, the upper half being broken away and in section to show the application of my invention;

Fig. 2 is a sectional view on the line 2—2 of Fig. 1, and

Fig. 3 is a top plan view of a part of the mechanism illustrated in Figs. 1 and 2.

Referring to the drawing, 3 represents the drive shaft of a motor vehicle transmission, 4 the intermediate or driven shaft, and 5 the countershaft. The intermediate shaft 4 may be piloted, as indicated at 6, in the shaft 3. A gear 7 on the shaft 3 meshes with a spur gear 8 on the countershaft 5, and a spur gear 9 on the countershaft 5 is in mesh with a second speed gear 12. The gear 12 rotates in floating relationship upon the intermediate shaft 4. Mounted on the intermediate shaft 4 between the drive gear 7 and the second speed gear 12 is a shiftable member 22 having on each of its sides and integral therewith clutch members 25 and 28, respectively, each formed with teeth indicated respectively at 26 and 29, said member 22 being slidably splined to the shaft 4 as shown. An annular groove 31ª may be formed in the member 22 in which is adapted to fit the shift fork 23 of a gear shift rail 24.

Assembled with the shiftable member 22 and located within the grooves of the splines 34 of the shaft 4 are spring fingers 15 having detents 32 and 33 which yieldably block the right and left movement of the shift member 22 with its clutch members 25 and 28 from a mid-way position between the friction discs 13 and 14. These spring members 15, three in number, are spaced equidistantly around the shaft 4 as may be seen in detail in Fig. 2.

Secured to the opposite extremities of the spring members 15 and also slidably splined to the intermediate shaft 4, and in register respectively with the drive gear 7 and the second gear 12, are friction discs 13 and 14 having conical friction faces 16 and 19 adapted to engage the spur teeth 17 and 21, respectively, of the gears 7 and 12.

The teeth 17 of the spur gear 7, which mesh with the teeth of spur gear 8 on the countershaft 5, have a portion of their outer surfaces shaped to closely receive the inner conical surface of the friction face 16 of the friction cone 13 so that by pressure of the friction face 16 on the teeth 17 the drive shaft 3 may cause the shafts 3 and 4 to be synchronized as to speed.

On the gear 7 opposite and aligned with the jaw teeth 26 of clutch member 25 are fixed jaw teeth 27 adapted to be engaged with the teeth 26 of slidable clutch member 25 to give positive clutch action.

The second speed gear 12, like the gear 7, has spur teeth 21 coned at one end to engage the friction surface 19 of the disc 14 and jaw clutch teeth 31 adapted to be engaged with the teeth 29 of the clutch member 28.

In operation the transmission synchronizer described herein operates as follows:

When the operator desires to shift into high or direct speed the fork 23 is moved to the left by means of the shift rail 24.

The motion of the fork 23 is transmitted to the shiftable member 22 which in turn urges the disc 13 with its conical friction face 16 against the teeth 17 through the instrumentality of the springs 15. This movement of the disc 13, which causes engagement between the cone 16 and its complementary portion of the gear teeth 17, also causes synchronization of the shafts 3 and 4 to take place. Further movement of the shiftable member 22 results in the depression of detent 32, thereby to permit the jaw teeth 26 of the slidable clutch member 25 to pass through the disc 13 and to engage with the jaw teeth 27 of the gear 7, thus to produce a positive two-way drive.

By similar successive action of the friction clutch 19—21 and jaw tooth clutch 29—31, synchronized second speed driving is effected, the action in this case being accomplished by moving the shiftable member 22 in the opposite direction as will be apparent from the drawing.

By enlarging the discs 13 and 14 to a diameter greater than the diameter of the gears 7 and 12, respectively, and by providing for frictional engagement between the friction cones carried at the peripheries of the discs and complementary conical surfaces formed directly upon the teeth of the gears, I have considerably increased the area of contact between the frictionally engaging elements of the synchronizer clutches. This construction and arrangement manifestly will prolong the useful life of the synchronizer which must necessarily be subjected to wear by the inherent nature of its function. Furthermore, the construction and arrangement described herein permits of a more compact high and second gear synchromesh assembly for the reason that the synchronizing cones actually embrace the outer peripherial or tooth portions of the high and second speed gears, and the jaw clutch element, being contained within the periphery of the gear, adds nothing to the width thereof. This contributes to axial compactness. Obviously, the same arrangement may be carried out in connection wth any of the adjacent elements of a transmission gear train where synchronization is desirable.

I claim:

1. A synchronizing mechanism, comprising aligned torque-transmitting members, a gear carried by one of said members, a jaw clutch element fixed on said one member, located within the periphery of said gear, a movable jaw clutch element drivingly associated with said other member, and axially slidable into positive clutching engagement with said fixed jaw clutch element, and a friction clutch member having a laterally flanged periphery overlying portions of the teeth of said gear, the said tooth portions being formed with friction clutching surfaces engageable with a coacting interior friction clutch face in said flanged periphery, and means for causing the friction clutch element to engage said gear teeth clutching surfaces when said movable clutch element is moved toward positive clutching position.

2. A synchronizer mechanism, comprising aligned torque-transmitting members, a gear carried by one of said members, said gear having an integral internal jaw clutch element disposed within its toothed periphery, a movable jaw clutch element drivingly associated with said other member, and axially slidable into positive clutching engagement with said gear jaw clutch element, and a friction clutch member having a laterally flanged periphery overlying portions of the teeth of said gear, the said tooth portions being formed with friction clutching surfaces engageable with a coacting interior friction clutch face in said flanged periphery, and means for causing the friction clutch element to engage said gear teeth clutching surfaces when said movable clutch element is moved toward positive clutching position.

JOHN M. SIMPSON.